US011489340B2

(12) United States Patent
Bitter et al.

(10) Patent No.: US 11,489,340 B2
(45) Date of Patent: Nov. 1, 2022

(54) MAGNETICALLY CONTROLLABLE THROTTLE FOR REACTIVE POWER COMPENSATION HAVING CAPACITIVELY CONNECTED AUXILIARY WINDINGS

(71) Applicant: Siemens Energy Global GmbH & Co. KG, Munich (DE)

(72) Inventors: Oliver Bitter, Zirndorf (DE); Ronny Fritsche, Nuremberg (DE); Thomas Hammer, Schwabach (DE); Matthias Kuestermann, Nuremberg (DE); Thomas Manthe, Ueckermuende (DE); Ralph Morgenstern, Erlangen (DE); Georg Pilz, Poxdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/059,588

(22) PCT Filed: May 2, 2019

(86) PCT No.: PCT/EP2019/061189
§ 371 (c)(1),
(2) Date: Nov. 30, 2020

(87) PCT Pub. No.: WO2019/228743
PCT Pub. Date: Dec. 5, 2019

(65) Prior Publication Data
US 2021/0218246 A1    Jul. 15, 2021

(30) Foreign Application Priority Data

May 30, 2018    (DE) .......................... 10201820626.5

(51) Int. Cl.
*H02J 3/18*    (2006.01)
*G05F 1/38*    (2006.01)
(Continued)

(52) U.S. Cl.
CPC .............. *H02J 3/1821* (2013.01); *G05F 1/38* (2013.01); *G05F 1/70* (2013.01); *H01F 27/303* (2013.01); *H02J 3/16* (2013.01); *H02J 3/1864* (2013.01)

(58) Field of Classification Search
CPC .......... H02J 3/1864; H02J 3/1821; H02J 3/16; G05F 1/38; H01F 27/303
See application file for complete search history.

(56) References Cited

U.S. PATENT DOCUMENTS 3,942,100 A    3/1976  Kaeuferle et al.
5,617,447 A    4/1997  Tambe
(Continued)

FOREIGN PATENT DOCUMENTS

CN    1133545 A    10/1996
CN    1279816 A    1/2001
(Continued)

OTHER PUBLICATIONS

Ontiveros, L. et al: "Compensación de potencia reactiva en zonas deficitarias de sistemas electricos"; In: 2014 IEEE Biennial Congress of Argentina (ARGENCON); 2014; pp. 867-872; doi:10.1109/ARGENCON.2014.6868603 [abgerufen am May 14, 2019].
(Continued)

*Primary Examiner* — Harry R Behm
(74) *Attorney, Agent, or Firm* — Laurence A. Greenberg; Werner H. Stemer; Ralph E. Locher

(57) ABSTRACT

In order to create a full variable shunt reactor having two magnetically controllable high-voltage throttles which is compact and at the same time can also provide capacitive reactive power, auxiliary windings are used which are inductively coupled to the high-voltage throttles. The auxiliary windings are connected to at least one capacitively acting component.

10 Claims, 7 Drawing Sheets

(51) Int. Cl.
    *G05F 1/70*     (2006.01)
    *H01F 27/30*    (2006.01)
    *H02J 3/16*     (2006.01)

(56) References Cited

U.S. PATENT DOCUMENTS

| | | |
|---|---|---|
| 10,056,886 B2 | 8/2018 | Bunin et al. |
| 2004/0012472 A1* | 1/2004 | Sasse ............ H01F 29/14 336/180 |
| 2017/0133949 A1* | 5/2017 | Pieschel .......... H02M 1/32 |
| 2017/0134011 A1* | 5/2017 | Bunin ............ H01F 29/14 |

FOREIGN PATENT DOCUMENTS

| | | |
|---|---|---|
| CN | 102891000 A | 1/2013 |
| CN | 104009485 A | 8/2014 |
| DE | 2318952 A1 | 9/1974 |
| DE | 202013004706 U1 | 7/2013 |
| DE | 102012110969 A1 | 3/2014 |
| EP | 2541752 A1 | 1/2013 |
| EP | 3168708 A1 | 5/2017 |
| SU | 1101967 A | 7/1984 |

OTHER PUBLICATIONS

Wikipedia:" Ausgleichswicklung"; Version Mar. 26, 2018.

* cited by examiner

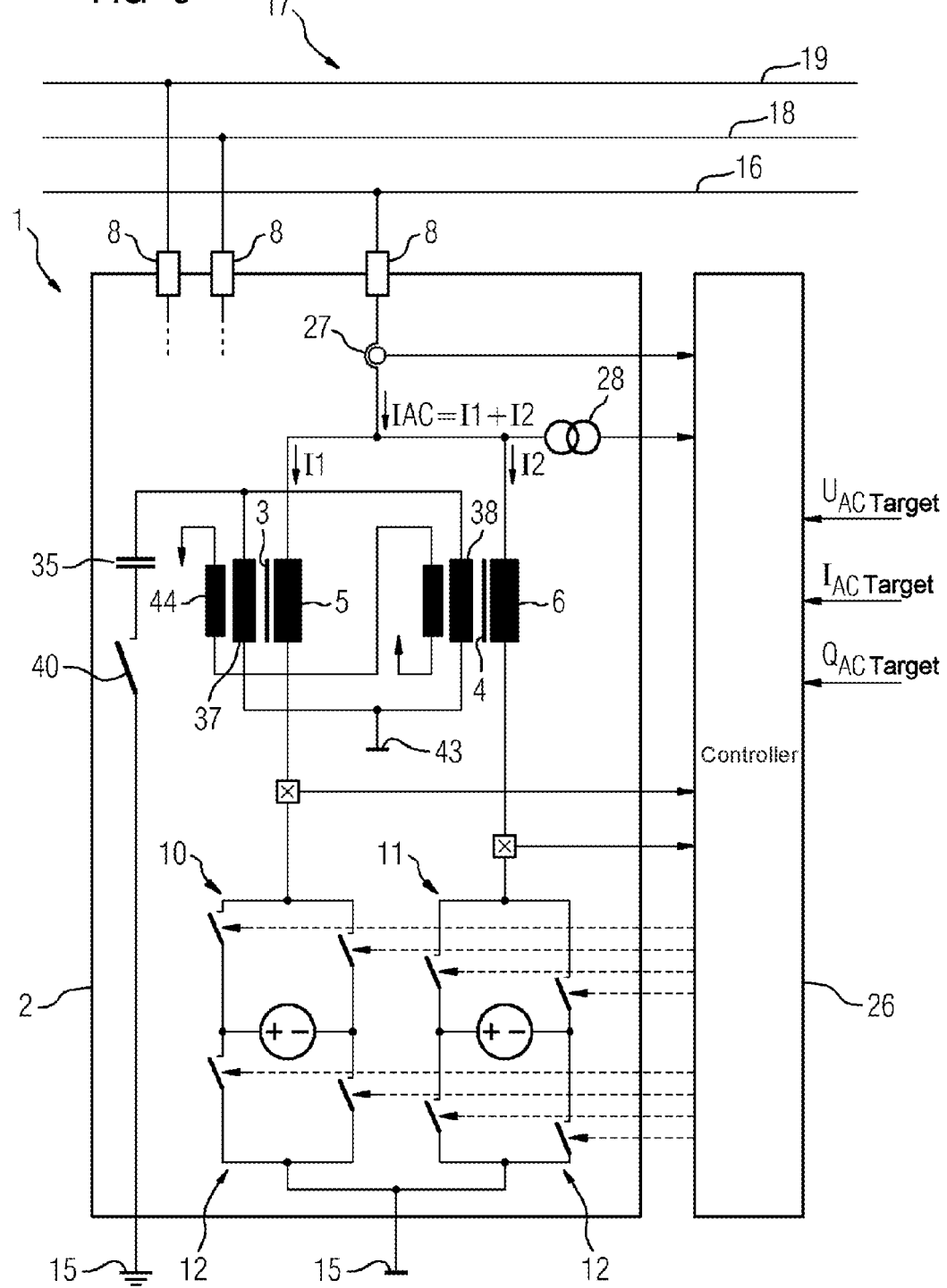

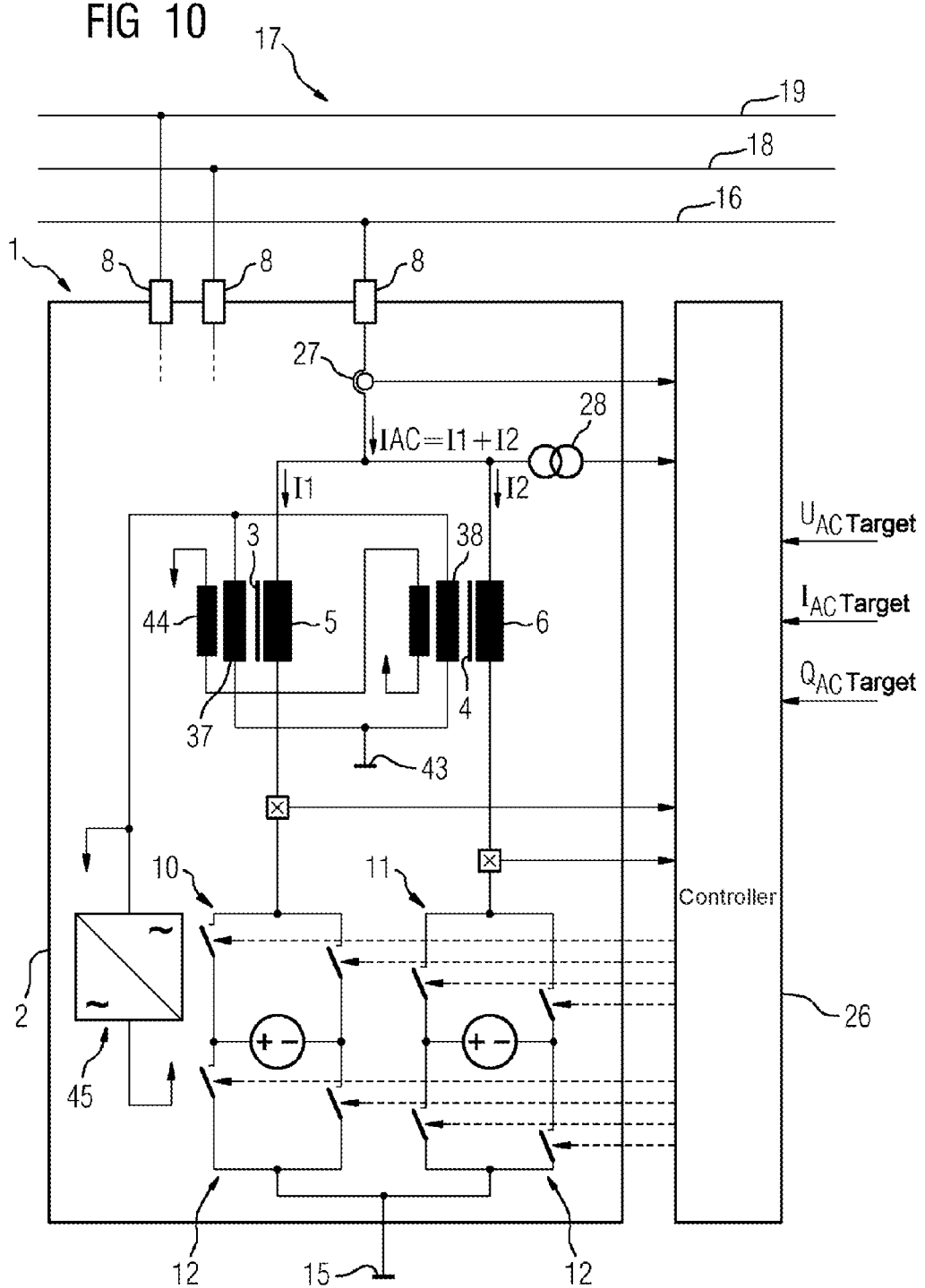

MAGNETICALLY CONTROLLABLE THROTTLE FOR REACTIVE POWER COMPENSATION HAVING CAPACITIVELY CONNECTED AUXILIARY WINDINGS

BACKGROUND OF THE INVENTION

Field of the Invention

The invention relates to a device for reactive power compensation in a high-voltage grid comprising at least one phase conductor having at least one high-voltage terminal, which is designed for connection with the phase conductor, wherein, for each high-voltage terminal, a first and a second core section, which are elements of a closed magnetic circuit, a first high-voltage winding, which encloses the first core section, and a second high-voltage winding, which encloses the second core section and is connected in parallel with the first high-voltage winding, at least one saturation switching branch, which is designed for the saturation of the core sections and comprises actuatable power semiconductor switches, and a control unit for the actuation of the power semiconductor switches are provided, wherein the first and the second high-voltage windings, at their high-voltage end, are connected to the associated high-voltage terminal and, on their low-voltage side, are connectable to a or the saturation switching branch.

A device of this type is already known from EP 3 168 708 A1. Herein, a "full variable shunt reactor" (FVSR) is disclosed, which constitutes a further development of a "magnetically controlled shunt reactor" (MCSR). The previously known device comprises two mutually parallel-connected high-voltage windings, each of which encloses one core limb of a closed iron core and which, at their high-voltage end, are connected to a phase conductor of a high-voltage grid. The low-voltage sides of the high-voltage windings, by means of a transistor switch, are connectable either to an appropriately polarized converter, or directly to a grounding terminal. The converter is designed to generate a direct current in the high-voltage winding which is connected thereto. The setting of the direct current is such that the core limb which is enclosed by the winding is brought to a desired saturation state. In this saturation state, the core material, for example, assumes a very low magnetic permeability, as a result of which the magnetic resistance of the winding is increased and the inductance thereof is reduced. The saturation of the above-mentioned core sections is polarization-dependent, such that an alternating current flowing through the windings, depending upon its polarization, essentially flows through only one of the two high-voltage windings. Thus, for example, a positive alternating current flows through the first high-voltage winding, whereas a negative alternating current flows through the second high-voltage winding to ground. If current is only driven through one high-voltage winding, a direct current can be applied to the respective other winding, in which no alternating current is flowing, in order to saturate the core limb which is enclosed therein to the desired degree.

Magnetically controlled throttle coils are further known from DE 20 2013 004 706 U1 and from DE 10 2012 110 969.

The known device is handicapped by a disadvantage, in that it is comprised exclusively of inductively acting components, and is not capable of delivering any capacitive reactive power, if required.

SUMMARY OF THE INVENTION

The object of the invention is the provision of a device of the above-mentioned type, which is compact and which can simultaneously supply capacitive reactive power.

The invention fulfils this object by means of auxiliary windings, which are inductively coupled to the high-voltage windings, wherein the auxiliary windings are interconnected with at least one capacitively acting component.

The device according to the invention, in addition to components which are required for "full variable shunt reactors" (FVSR), further comprises auxiliary windings, which are inductively coupled with at least one of the high-voltage windings of the FVSR. The auxiliary windings are thus interconnected with a capacitively acting component. The term "interconnected" signifies that each capacitively acting component is galvanically connected, either directly or via an electrical component such as, for example, a switching unit, to at least one of the auxiliary windings. The capacitive component, for example a capacitor or a "flexible AC transmission system" (FACTS) component equipped with capacitors, such as, for example, a static synchronous compensator (STATCOM), can thus influence the degree and the direction of reactive power compensation. The control unit can actuate the power semiconductor switches of the FVSR such that the inductive effect of the high-voltage winding, during reactive power compensation, is virtually entirely suppressed, such that only the capacitive component deploys its action, thereby contributing to an overall capacitive reactive power compensation. By way of deviation, the control unit can ensure that the inductive action of the high-voltage windings is deployed in full, and is thus superimposed upon the action of the capacitive component such that, overall, inductive reactive power compensation is executed.

In the context of the invention, moreover, it is also possible, however, for the capacitively acting component to be interconnected with the auxiliary windings via a switching unit, wherein said switching unit is connected to a separate control unit or to the control unit of the FVSR, such that the latter can switch-in the capacitive component, as required, or can isolate the capacitive component from the auxiliary windings.

As a switching unit for the connection and disconnection of the capacitively acting component to and from the auxiliary windings, an electronic switch, generally a power semiconductor switch such as, for example, an IGBT, a GTO, a thyristor or similar, is preferably considered. In this case, the switching unit preferably comprises two power semiconductor switches connected in mutual opposition, such that the switching of currents in both directions is possible.

In principle, in the context of the invention, both the interconnection and the number of capacitively acting components are arbitrary.

Preferably, however, each auxiliary winding comprises two auxiliary part-windings, wherein each high-voltage winding is inductively coupled to one auxiliary part-winding, and the auxiliary part-windings are connected to one another in series or in parallel. According to this advantageous further development, the high-voltage windings and the auxiliary part-windings, for example, are arranged concentrically to one another, wherein they enclose the same core section, for example a core limb. The high-voltage windings and the auxiliary part-windings are configured in the form of hollow cylinders, wherein the core limb extends through the inner auxiliary winding, which is enclosed by the high-voltage winding.

According to a preferred configuration of the invention, the capacitively acting component incorporates at least one capacitor. The term "capacitor" is to be understood here as either a single capacitor, a series-connected arrangement and/or a parallel-connected arrangement of a plurality of capacitors, and thus also includes capacitor banks. The capacitor can be arranged in the tank of the FVSR. By way of deviation, the capacitor can be arranged in a dedicated separate housing, or can be set up in an air-insulated arrangement.

Further advantages are associated with a delta-connected configuration of the auxiliary windings. In such a configuration of the invention, it is appropriate that a capacitor is connected in parallel with each auxiliary winding. If each auxiliary winding is comprised of two series-connected auxiliary part-windings, the capacitor is connected in parallel with the series-connected arrangement of auxiliary part-windings. By way of deviation, however, it is also possible for the capacitor to likewise be comprised of two partial capacitors, wherein each partial capacitor is connected in parallel with an auxiliary part-winding. In a capacitor branch, which bridges the auxiliary winding or the auxiliary part-winding, a switching unit is preferably arranged which, in its closed position, is responsible for the parallel connection of the capacitor to the auxiliary windings, wherein the switching unit, in its interrupting position, suspends the capacitive action of the capacitor.

According to a further configuration of the invention, each capacitively acting component is again configured in the form of a capacitor, wherein the auxiliary windings constitute a delta-connected arrangement, and wherein the potential point between two auxiliary windings is connected to one pole of a capacitor. In this embodiment of the invention, the auxiliary windings, which again can be comprised of part-windings, are also configured in a delta-connected arrangement. The potential point between two auxiliary windings is connected, either directly or via a switching unit, to one pole of a capacitor. The capacitor, at the side thereof which is averted from the auxiliary windings, is preferably grounded. By way of deviation, the capacitors, at the side thereof which is averted from the auxiliary windings, are interconnected with one another, wherein they constitute a "capacitor neutral point". In the context of the invention, the capacitor neutral point can be grounded. In a differing configuration, the capacitor neutral point is a floating, and thus not a grounded capacitor neutral point.

In the context of the invention, it is moreover possible that the capacitively acting component is respectively configured as a capacitor, wherein the auxiliary windings constitute a star-connected arrangement, such that a common auxiliary winding neutral point is provided. The auxiliary windings, at the side thereof which is averted from the neutral point, are respectively connected to one pole of a capacitor. By way of deviation, it is possible that the auxiliary windings which constitute an auxiliary winding neutral point, at the side thereof which is averted from the auxiliary winding neutral point, are interconnected via a capacitor. In the capacitor branch, which connects the two auxiliary windings to one another, a switching unit, as described above, can be arranged in turn.

According to a further embodiment of the invention, the auxiliary windings function as compensating windings. A precondition for this function is the constitution of the auxiliary windings in a delta-connected arrangement. A delta-connected arrangement ensures that harmonics of the network frequency which occur in FVSR operation, the harmonic number of which is uneven and is exactly divisible by three, are suppressed. According to this embodiment of the invention, in other words, windings which are required in any event, i.e. the compensating windings, are employed in a cost-effective and space-saving manner for the integration of capacitive components in the FVSR. In other words, a cost-effective, space-saving and effective device is provided. The compensating windings suppress e.g. the third, ninth and fifteenth harmonics of the network frequency.

According to a differing configuration of the invention, the capacitively acting component incorporates at least one static reactive power compensator which, for each high-voltage terminal, comprises a series-connected arrangement of two-pole submodules, wherein each submodule constitutes a full-bridge circuit of power semiconductor switches and a capacitor. A reactive power compensator of this type is also known as a "STATCOM".

In a full-bridge circuit, the submodule comprises a first series-connected branch and a second series-connected branch. A capacitor of the submodule is respectively parallel-connected to the two series-connected branches. Each series-connected branch comprises a series-connected arrangement of power semiconductor switches. In each case, the potential point between the power semiconductor switches is connected to a terminal. In other words, the potential point between the power semiconductor switches of the first series-connected branch is connected to a first terminal of the submodule, and the potential point between the power semiconductor switches of the second series-connected branch is connected to a second terminal of the submodule. In the series-connected arrangement of submodules, the second terminal of the first submodule, in turn, is connected to the first terminal of the second submodule. The number of submodules is dependent upon respective requirements in force. As power semiconductor switches, interruptible power semiconductor switches are preferred for this purpose, particularly IGBTs, to each of which a freewheeling diode is inversely connected in parallel.

According to an appropriate further development in this regard, the auxiliary windings constitute a delta-connected arrangement, wherein each potential point between two auxiliary windings is connected to a series-connected arrangement of two-pole submodules. Here again, it is advantageous if the auxiliary windings, in turn, comprise two auxiliary part-windings, which are preferably connected to one another in series. Each auxiliary part-winding, in turn, is inductively coupled with a high-voltage winding, wherein the above-mentioned descriptions apply correspondingly in this case. Here again, the auxiliary windings can be employed as compensating windings for the suppression of harmonics of the network frequency which are divisible by three.

Preferably, at least one capacitive component is connected by means of a switching unit to at least one auxiliary winding. As described above, by means of a switching unit, which can be configured in the form of an electronic or mechanical switch, the capacitive action of the capacitive component is controllable. If the switching unit is configured as an electronic switch, the latter can be connected to the existing control unit. Moreover, it is also possible for the electronic switch, but also the mechanical switch of the capacitive component to be actuated by means of a dedicated and separate controller.

According to a preferred configuration of the invention, the device according to the invention comprises a tank, in which the high-voltage windings and the closed magnetic circuit are arranged. The tank is preferably filled with an insulating fluid, for example an ester fluid or a mineral oil, which firstly provides the requisite insulation, and secondly delivers the necessary cooling for components which, in service, carry a high voltage. Each capacitive component, for example each capacitor or each static reactive power compensation unit, according to one variant, are arranged in the same tank as the high-voltage windings of the FVSR.

By way of deviation, the capacitive component is arranged outside the tank of the FVSR proper. In other words, the capacitively acting component is arranged separately. It is thus possible for the capacitively acting component to be arranged in a second tank, which is likewise filled with an insulating fluid, for example a gas or a liquid. In this case, bushings are required, in order to provide the requisite electrical insulation between tanks or housings, which are at a ground potential, and high-voltage conductors which connect the auxiliary windings to each capacitively acting component.

Further appropriate configurations and advantages of the invention are the subject matter of the following description of exemplary embodiments of the invention, with reference to the figures in the drawing, wherein identically functioning components are identified by the same reference symbols.

BRIEF DESCRIPTION OF THE SEVERAL VIEWS OF THE DRAWING

FIG. 9 shows a further exemplary embodiment of the invention, and FIG. 10 shows a further exemplary embodiment of the invention, in a schematic representation.

DETAILED DESCRIPTION OF THE INVENTION

Figure 1:
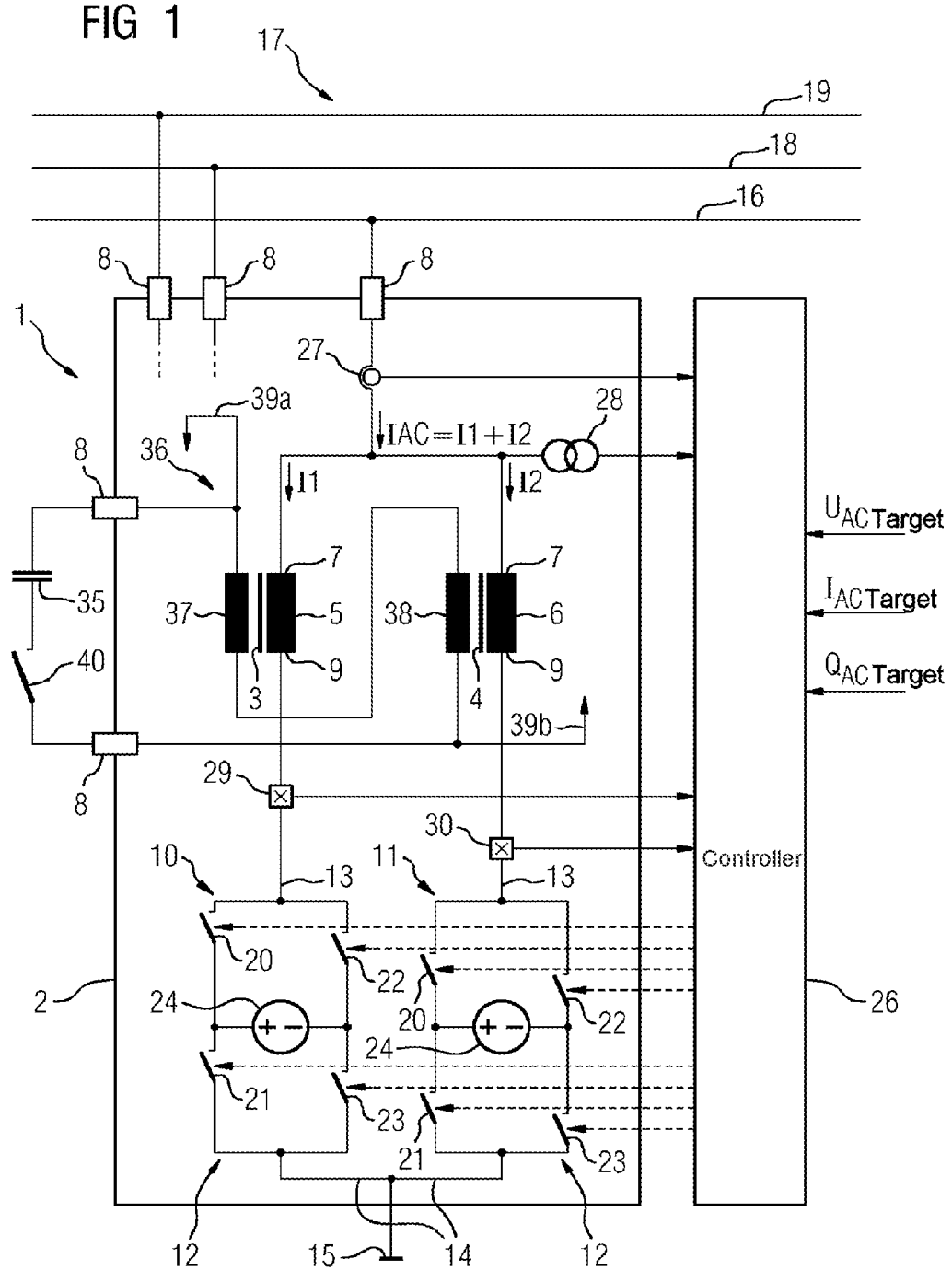
FIG. 1 shows an exemplary embodiment of the device according to the invention, in a schematic representation.

FIG. 1 shows an exemplary embodiment of the device 1 according to the invention, which comprises an insulating fluid-filled tank 2. As an insulating fluid, mineral oils, but also ester fluids or similar, are conceivable. The insulating fluid firstly provides the requisite dielectric strength for components of the device 1 which carry a high-voltage potential vis-à-vis the tank 2, which assumes a ground potential. The insulating fluid moreover assumes a cooling function for components which generate heat in service.

Within the tank 2, a core is arranged, which is comprised of a magnetizable material, in this case iron plates arranged in surface-to-surface contact with one another, and which constitute a first core limb 3 and a second core limb 4 by way of core sections. The first core limb 3 is enclosed by a first high-voltage winding 5. The second core limb 4 is enclosed by a second high-voltage winding 6. For the constitution of a closed magnetic or iron circuit, yokes, which are not diagrammatically represented, are employed, which extend from the upper end of the first core limb 3 to the upper end of the second core limb 4, and from the lower end of the core limb 3 to the lower end of the core limb 4. In FIG. 1, wound core limbs 3 and 4 for one phase are illustrated. For the two other phases of the high-voltage grid, in each case, two further wound and unrepresented core limbs are arranged in the tank 2, which are interconnected by means of the yokes. Moreover, two likewise diagrammatically unrepresented flux return limbs are provided, which are not enclosed by any winding, and which extend to the left and right, parallel to the core limbs 3 or 4. In other words, in the single-phase embodiment of the FVSR represented in FIG. 1, a "6/2 core" is provided. By way of deviation herefrom, the device 1 according to the invention can comprise a tank 2 for each phase. In each single-phase tank 2, a 2/2 core having two wound core limbs 3 and 3 and two unwound flux return limbs would then be arranged.

The first high-voltage winding 5 and the second high-voltage winding 6 respectively comprise a high-voltage end 7, by means of which the latter are connected to a high-voltage terminal 8. If the device 1 is arranged in an insulating fluid-filled tank, the high-voltage terminal 8 is configured, for example, as a bushing. The bushing penetrates the tank wall and, at its free end, which is arranged externally to the tank, is fitted with an outdoor terminal. The function of the diagrammatically unrepresented outdoor terminal is the connection of an air-insulated conductor. At their low-voltage end 9, the first high-voltage winding 5 and the second high-voltage winding 6 are respectively connected to a saturation switching branch 10 or 11, wherein each saturation switching branch 10, 11 comprises a two-pole submodule 12 which, at a first terminal 13, is connected to the respective high-voltage winding 5 or 6 and, at a second terminal 14, is connected to a common potential point 15. In the exemplary embodiment illustrated, the potential point 15 is grounded. In other words, the high-voltage windings 5 and 6 are mutually parallel-connected, or can at least be switched in parallel.

By means of the high-voltage terminal 8, the high-voltage windings 5 and 6 are connected to a phase conductor 16 of a high-voltage grid 17, wherein the high-voltage grid 17 comprises two further phase conductors 18 and 19, each of which, in turn, is connected via a high-voltage terminal 8 to two high-voltage windings and two saturation switching branches. In other words, the device 1, for each phase 16, 18, 19 of the high-voltage grid 17, assumes an identical structure wherein, in the interests of clarity, only the structure of one phase conductor 16 is represented.

For the full variable shunt reactor (FVSR) represented here, it is essential that each saturation switching branch 10 or 11 comprises a two-pole submodule 12, which incorporates a bridge circuit of power semiconductor switches 20, 21, 22 and 23, and a DC voltage source 24, which is preferably of a unipolar design, and thus comprises a fixed positive pole and a fixed negative pole.

In the context of the invention, the bridge circuit can be a half-bridge or a full-bridge. In FIG. 1, each submodule incorporates a full-bridge having four power semiconductor switches 20, 21, 22, 23. A half-bridge comprises only two power semiconductor switches. For the appropriate actuation of the four power semiconductor switches 20, 21, 22 and 23, a control unit 26 is provided which, at its input side, can be supplied with target values for voltage $UAC_{target}$, alternating current $IAC_{target}$ and reactive power $QAC_{target}$. For the detection of the alternating current IAC flowing from the phase conductor 16 to the high-voltage windings 5 and 6, a current sensor 27 is employed, wherein a voltage sensor 28 detects the voltage across the high-voltage winding 5 and 6 on the high-voltage side. The current sensor 27 and the voltage sensor 28 are connected by means of diagrammatically unrepresented signal lines to the control unit 26. On the low-voltage side 9 of the high-voltage winding 5 or 6, sensors 29 and 30 can also be seen, which are likewise connected to the control unit 26 by means of signal lines and which detect currents flowing between the respective submodule 12 and the respective high-voltage winding 5 or 6.

The power semiconductor switches 20, 21, 22 and 23 of a submodule 12, by means of appropriate actuation signals from the control unit 26, which are represented by broken lines, can execute a transition from an isolating setting, in which a current flux via the power semiconductor switches is interrupted, to a conducting setting, in which a current flux via the power semiconductor switches is permitted or, conversely, from the conducting setting to the isolating setting.

The operating mode of the device 1 is as follows: if the current detected by the current sensor 27, 28 or 29 is positive, the power semiconductor switches 22 and 23 of the saturation switching circuit 10 are closed. As a precondition, the core limb must previously have been saturated by a direct current flowing from the submodule 12 of the first saturation switching branch to the high-voltage winding 5 such that, for the positive half-wave of the alternating voltage, the AC resistance of the high-voltage winding 5 is lower than the AC resistance of the high-voltage winding 6. Accordingly, virtually the entire alternating current IAC flows to ground via the current path which is identified as I1. In the positive half-wave of the current, the power semiconductor switches 21 and 22 are therefore closed, such that the DC voltage source 24 of the saturation switching circuit 11 drives a direct current, which flows from the high-voltage winding 6 to ground 15. During the positive half-wave of the alternating voltage in the phase conductor 16, the second core limb 4 can thus be saturated in the desired manner.

During the negative half-wave, in which the current measured by the sensor 27 or 30 is negative, conversely, the alternating current IAC essentially flows via the second high-voltage winding 6 such that, by the closing of the power semiconductor switches 20 and 23 and the opening of the power semiconductor switches 21 and 22 of the submodule 12 of the first saturation switching branch 10, a saturation direct current is generated, which flows from the submodule 12 to the first high-voltage winding 5. By the closing of the power semiconductor switches 22 and 21, alternatively, a current flows in the opposing direction. By means of appropriate switching, the desired adjustment of the saturation of the core limb 3 can be achieved.

Figure 2:
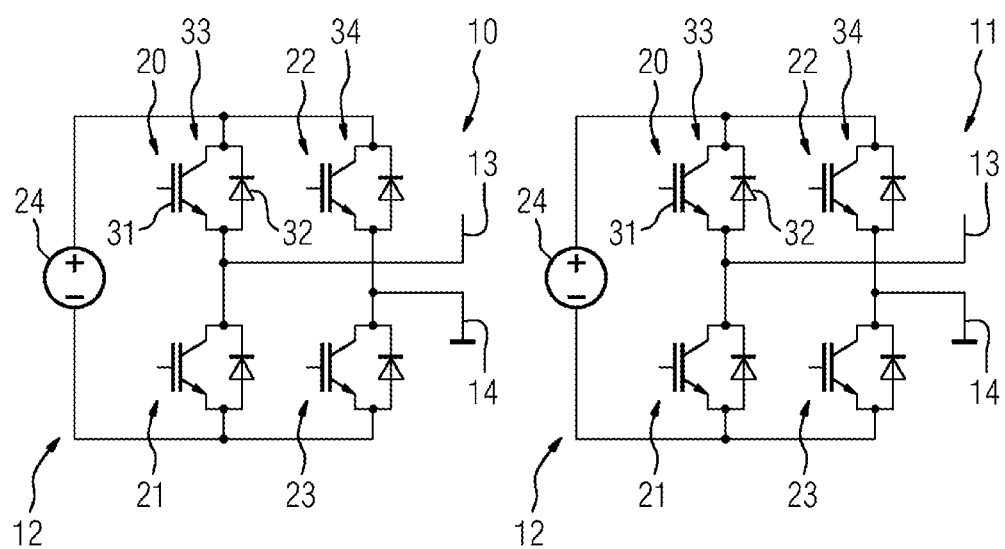
FIG. 2 shows the saturation switching branches of the device according to FIG. 1.

FIG. 2 shows the structure of the submodules 12 of the first and second saturation switching circuit 10, 11 in greater detail. It can be seen that the submodules of both the saturation switching branches 10 or 11 are identically structured. It can further be seen that the power semiconductor switches 20, 21, 22, 23 comprise an "IGBT" 31, to which a freewheeling diode 32 is inversely connected in parallel. In principle, the structure of an IGBT having a freewheeling diode is known, such that it is not necessary for the operating mode thereof to be addressed in any greater detail here. Essentially, the function of the freewheeling diode 22 is the protection of the IGBT against overvoltages in the reverse direction. The IGBT 31 and the diode 32 are generally arranged in a common switch housing. Here, the IGBT 31 and the freewheeling diode 32 are designated in combination as a power semiconductor.

Each module 12 is configured as a "full-bridge", and incorporates a first series-connected branch 33 and a second series-connected branch 34, comprised respectively of two series-connected power semiconductor switches 20, 21 or 22 and 23. The potential point between the power semiconductor switches 20, 21 of the first series-connected branch 33 is connected to the first terminal 13, and the potential point between the power semiconductor switches 22 and 23 of the second series-connected branch 34 is connected to the terminal 14 of the submodule 12.

Thus far, only the method of operation of the device 1 represented in FIG. 1 as a "full variable shunt reactor" (FVSR) has been explained. As represented in FIG. 1, the device moreover comprises a capacitively acting component, which is embodied in FIG. 1 as a capacitor 35. The capacitor is parallel-connected to an auxiliary winding 36, wherein the auxiliary winding is comprised of two auxiliary part-windings 37 and 38, which are connected to one another in series. The auxiliary part-winding 37 is inductively coupled to the first high-voltage winding 5, and the second auxiliary part-winding 38 is inductively coupled to the second high-voltage winding 6. The high-voltage windings 5 or 6 and the respective auxiliary part-winding 37 or 38 are arranged concentrically to one another, wherein they enclose the same core section 3 or 4 of the core, which is otherwise not illustrated further.

In FIG. 1, only one auxiliary winding 36 is shown for the phase illustrated therein. In the tank 2, however, further auxiliary windings for the other phases are provided, which are structured identically and are interconnected with the capacitor 35 in the same manner. The auxiliary windings 36 of the different phases are connected with one another in a delta-connected arrangement. This delta-connected arrangement is indicated by the arrows 39a or 39b. Additionally, in the parallel branch of the auxiliary winding, in which the capacitor 35 is arranged, a switch 40 is schematically represented which, in the exemplary embodiment represented, comprises two inversely parallel-connected thyristors. By means of the electronic switch 40, the capacitor 35 of the auxiliary winding 36 can be connected in parallel, or the action of the capacitively acting component 35 can be suppressed.

The capacitor 35 is represented in FIG. 1 as a single capacitor, which is arranged outside the tank of the FVSR. However, the capacitor comprises a number of mutually series- or parallel-connected capacitors and, in consequence, can also be described as a capacitor bank. The number of parallel- or series-connected capacitors is dependent upon respective requirements, wherein the capacitive action can be increased or reduced.

The capacitor or, in other words, the capacitor bank 35, in the same way as the switch, is arranged outside the tank 2 of the FVSR. In order to permit an electrical connection with the auxiliary winding 36, which is arranged in the tank 2, appropriate bushings 8 are again provided, which permits a dielectric penetration of the high-voltage line through the tank wall, which is at ground potential.

Figure 3:
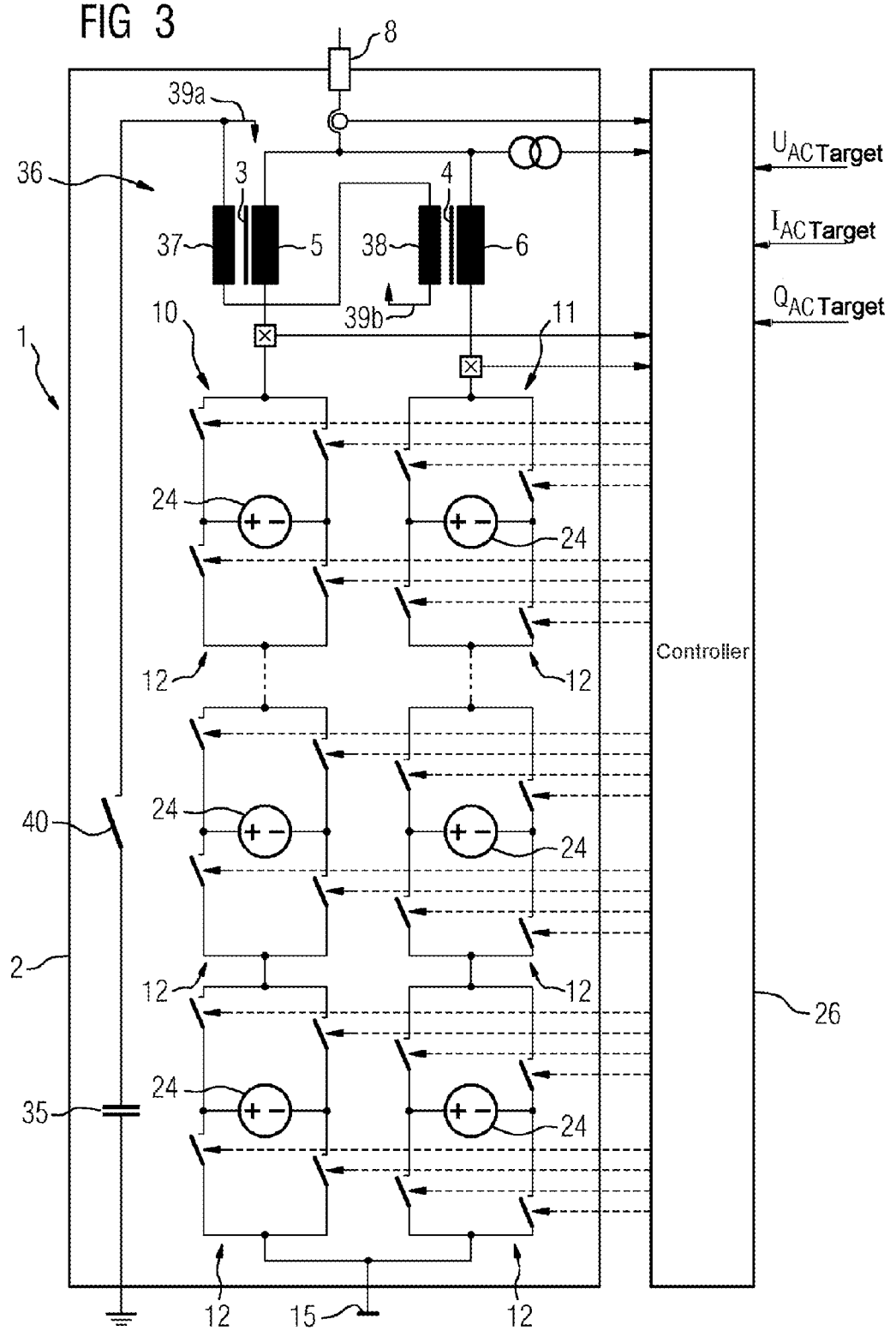
FIG. 3 shows a further exemplary embodiment of the device according to the invention.

FIG. 3 shows a further exemplary embodiment of the device 1 according to the invention wherein, in the interests of clarity, only components for connection with one phase of the high-voltage grid 17 are illustrated. In the exemplary embodiment illustrated, each saturation branch 10 or 11 comprises a series-connected arrangement of a plurality of submodules 12, which are either identically or differently actuated by the control unit 26, such that the DC voltage for the generation of the direct current which is employed for the saturation of the core limbs 3, 4 is correspondingly scalable to respective requirements. The auxiliary winding 36 again comprises two auxiliary part-windings 37 and 38, which are connected to one another in series, wherein the auxiliary winding 36 illustrated, as indicated by the arrows 39*a* and 39*b*, in combination with the auxiliary windings of the other phases, constitutes a delta-connected arrangement. In other words, the auxiliary part-winding 37, at the end 39*a* thereof, is connected to an auxiliary part-winding of a second phase, which is not represented in FIG. 3. The same applies correspondingly to the auxiliary part-winding 38 which, at the end 39*b* thereof, is connected to an auxiliary part-winding of another phase, which is not represented in FIG. 3. The potential point between two auxiliary windings 36 of different phase, in turn, is connected by means of the switch 40 to one pole of a capacitor 35 or of a capacitor bank, wherein each capacitor 35, at the end thereof which is averted from the compensating winding 36 and from the switch 40, is connected to the ground potential 15. Both the capacitor 35 and the switch 40 are arranged within the tank 2 of the device 1. In this manner, a particularly space-saving device 1 is provided. Moreover, the complexity associated with the lead-out of high-voltage conductors from the tank 2, in comparison with the exemplary embodiment represented in FIG. 1, is eliminated.

FIGS. 4, 5, 6, 7 and 8 illustrate different interconnections between the inductively acting component, which is configured as a capacitor, and the auxiliary windings, wherein the parallel-connected high-voltage windings 5 and 6, in the interests of clarity, are illustrated as a single winding. The high-voltage windings 5 and 6, together with the high-voltage windings of the other phase, constitute a common neutral point 15, which is also represented in FIGS. 1 and 3. The common neutral point 15 is grounded. At the side thereof which is averted from the neutral point 15, the high-voltage windings 5, 6 are respectively connectable to one phase 16, 18 or 19 of the high-voltage grid 17. Both of the core limbs 3, 4 are commonly represented as a vertical stripe. It is essential that the high-voltage windings 5, 6, by means of the core limbs 3, 4 are inductively coupled to the auxiliary windings 36 of the various phases of the device 1.

Figure 4:
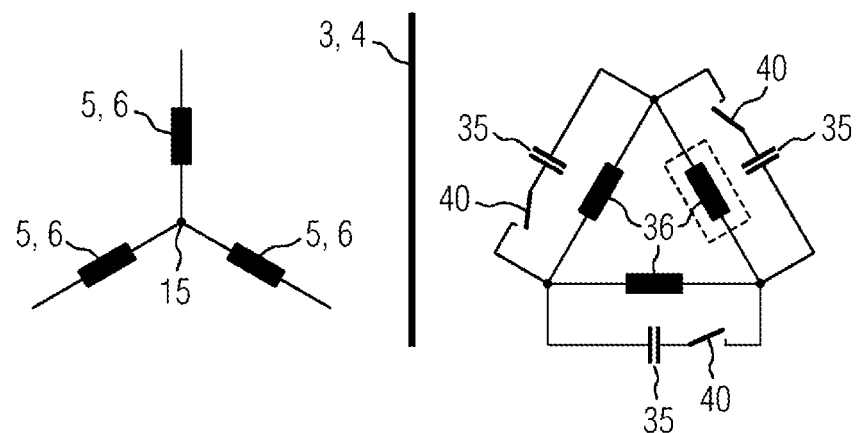
FIGS. 4 to 8 show exemplary embodiments, which illustrate the interconnection of capacitors, by way of capacitively acting component, with the auxiliary windings.

In FIG. 4, it can be seen that the inductively acting component 35, which is configured as a capacitor 35 or as a capacitor bank 35, is connected in parallel with each compensating winding 36 of the respective phase. In this regard, FIG. 4 corresponds to the configuration of the device 1 according to the invention represented in FIG. 1.

Figure 5:
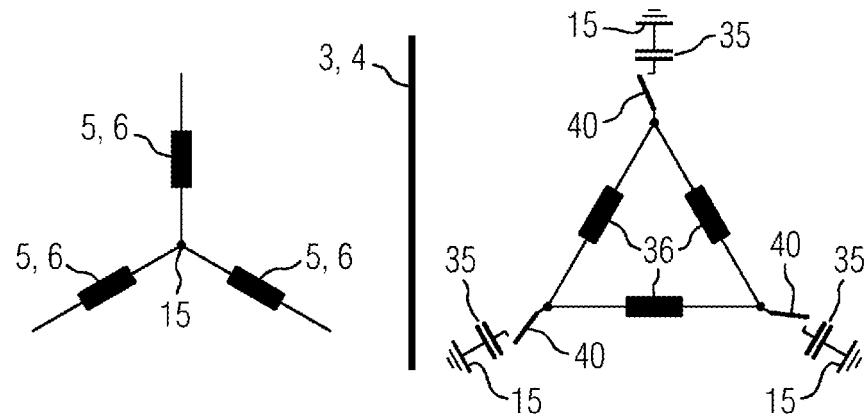

FIG. 5 again illustrates a delta-connected arrangement of the auxiliary windings 36 of the individual phases of the device 1 wherein, conversely to the exemplary embodiment represented in FIG. 4, each potential point between two auxiliary windings 36 of a different phase is connected to one pole of a capacitor 35, wherein the capacitor, at the side thereof which is averted from the auxiliary windings 36, is grounded by means of a grounding terminal 15. Between the auxiliary windings 36 and each capacitor 35, in turn, a power semiconductor switch 40 is connected, of which only one is represented in FIG. 5. In this regard, the arrangement represented in FIG. 5 corresponds to the exemplary embodiment of the invention represented in FIG. 3.

Figure 6:
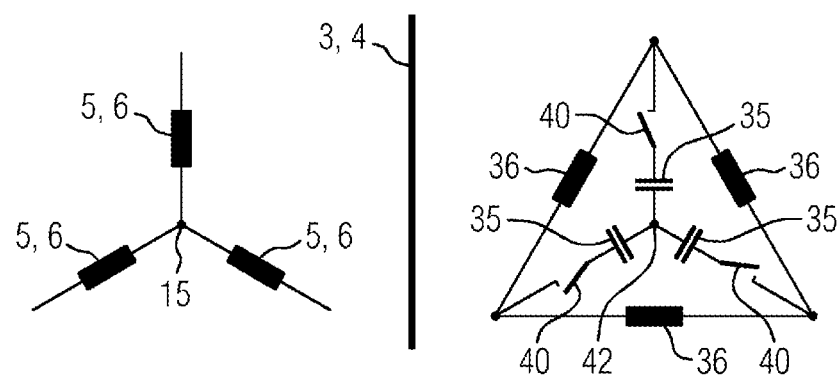

FIG. 6 shows a further exemplary embodiment of interconnection of the inductively acting component 35 and the auxiliary windings 36. Here again, the auxiliary windings 36 of a different phase are mutually interconnected in a delta-connected arrangement wherein, here again, at each potential point between the auxiliary windings 36 of the different phases a capacitor is connected which, however, at the side thereof which is averted from the auxiliary windings, constitutes a capacitor neutral point 42. In this regard, the representation according to FIG. 6 corresponds to the representation according to FIG. 5 wherein, however, the capacitor neutral point 42 in FIG. 6 is not grounded. Here again, a switch can also be employed.

Figure 7:
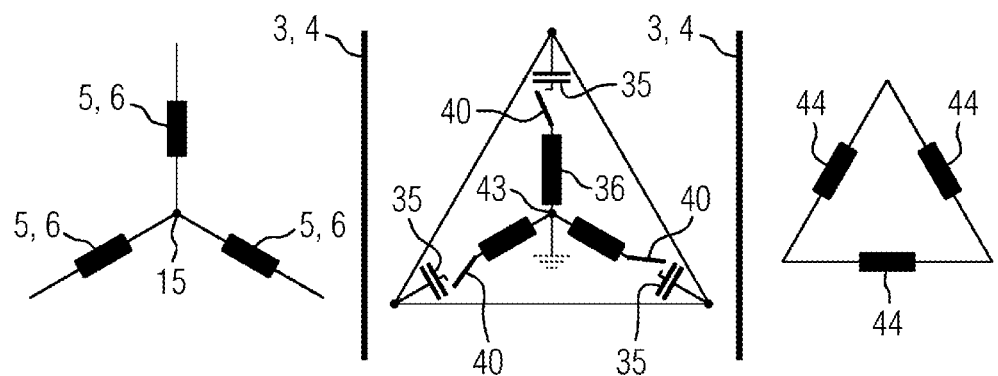

In the exemplary embodiment represented in FIG. 7, the auxiliary windings 36 of the different phases of the device 1 are arranged in a star-connected arrangement, such that an auxiliary winding neutral point 43 is constituted. At the end thereof which is averted from the auxiliary winding neutral point 43, each auxiliary winding 36 in turn is connected by means of a switch 40 to one pole of a capacitor 35. The capacitors 35 of the respective phases are thus connected to one another at the side thereof which is averted from the auxiliary windings 36, such that the capacitors 35 are mutually interconnected in a delta-connected arrangement. As previously mentioned above, in a delta-connected arrangement of the auxiliary windings 36, suppression of the uneven (current) harmonics of the network frequency which are divisible by three is possible with the aid of the auxiliary windings. For this reason, for each phase of the device 1, an additional compensating winding 44 is provided, wherein the compensating windings of different phases are likewise mutually interconnected in a delta-connected arrangement. The compensating windings 44 are inductively coupled with the high-voltage windings 5 and 6, and with the auxiliary windings 36, by means of the core section which is identified by the reference numbers 3 and 4, which forms part of a closed magnetic circuit.

Figure 8:
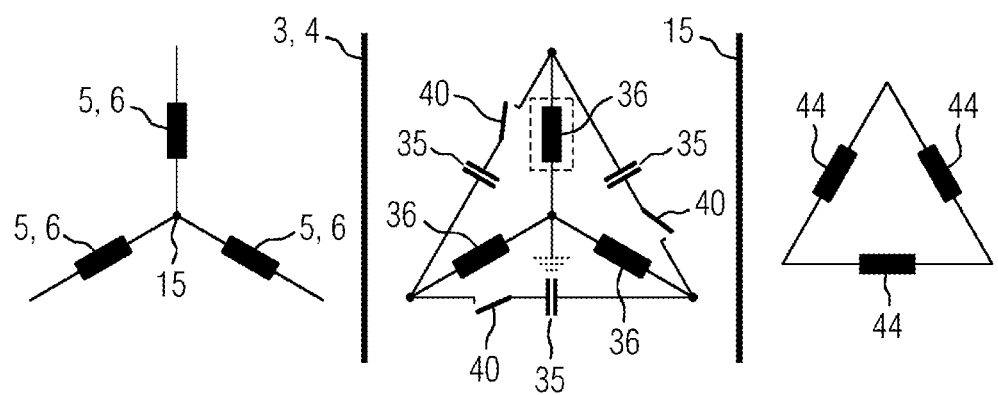

FIG. 8 substantially corresponds to the exemplary embodiment represented in FIG. 7 wherein, however, the auxiliary windings 36 which are mutually interconnected in a star-connected arrangement, at the end thereof which is averted from the auxiliary winding neutral point 43, are mutually interconnected in turn by means of capacitors 35.

In other words, the capacitors 35 constitute a delta-connected arrangement, wherein the potential point between two capacitors of different phases is connected to the auxiliary winding neutral point via an auxiliary winding 36. A switching unit 40 is moreover provided between each capacitor 35 and an auxiliary winding 36. As in the exemplary embodiment illustrated in FIG. 7, and also in FIG. 8, compensating windings 44 are provided for each phase of the device 1, wherein the three compensating windings 44, in mutual combination, constitute a delta-connected arrangement, such that harmonic oscillations of the network frequency can be suppressed by the compensating windings.

FIG. 9 illustrates a further exemplary embodiment of the device 1 according to the invention, wherein each auxiliary winding 36 of one phase is comprised of two auxiliary part-windings 37 and 38, which are connected to one another in parallel. The parallel-connected arrangement of auxiliary part-windings 37 and 38 is connected on one side to an auxiliary winding neutral point 43 and, at the end thereof which is averted from the auxiliary winding neutral point, to a capacitively acting component, which is configured in the form of a capacitor 35. The capacitor is connectable by means of a switch 40 to the ground potential 15. The switch 40 and the capacitor 35 are arranged in a tank which is filled with an insulating fluid, in this case a mineral oil. Compensating windings 44 can further be seen, which are likewise comprised of two compensating part-windings, which are connected in series with one another. The compensating winding, the auxiliary part-winding and the high-voltage winding 5 or 6 are respectively arranged concentrically to one another, and thus enclose a common core limb 3 or 4.

The exemplary embodiment illustrated in FIG. 10 corresponds to the exemplary embodiment illustrated in FIG. 9, with respect to the arrangement of the compensating winding 44, the auxiliary part-winding 37 or 38 and the high-voltage winding 5 or 6. The compensating windings 44 are connected to the unrepresented compensating windings of the other phases, to constitute a delta-connected arrangement. In the exemplary embodiment illustrated in FIG. 10, however, the inductively acting component is configured as a "STATCOM" 45, wherein the STATCOM comprises a series-connected arrangement of two-pole submodules, the structure of which corresponds to the submodules 12 in FIG. 2, wherein a unipolar capacitor is provided by way of a DC voltage source 24. By means of the full-bridge circuit, the voltage generated at the terminals 13 and 14 of the submodules of the STATCOM 45, i.e. the voltage across the DC voltage capacitor 24, can be a zero voltage or the inverse capacitor voltage. In principle, however, the structure of a static reactive power compensator STATCOM is known, such that any more detailed description thereof can be omitted. In the exemplary embodiment represented in FIG. 10, one STATCOM 45 is provided for each phase or for each high-voltage terminal 8 of the device 1. In general, three STATCOMs 45 are thus required which, as indicated in FIG. 10, are connected to one another in a delta-connected arrangement.

The invention claimed is:

1. A device for reactive power compensation in a high-voltage grid having at least one phase conductor, the device comprising:
   at least one high-voltage terminal configured for connecting with the at least one phase conductor;
   core sections including a first core section and a second core section being elements of a closed magnetic circuit;
   high-voltage windings including a first high-voltage winding enclosing said first core section and a second high-voltage winding enclosing said second core section and connected in parallel with said first high-voltage winding;
   at least one saturation switching branch configured for a saturation of said core sections and having actuatable power semiconductor switches;
   a controller for actuating said actuatable power semiconductor switches;
   said first high-voltage winding and said second high-voltage winding each having a high-voltage end connected to said at least one high-voltage terminal and, a low-voltage side connected to said at least one saturation switching branch;
   at least one capacitively acting component having capacitors; and
   auxiliary windings inductively coupled to said high-voltage windings, said auxiliary windings being interconnected with said at least one capacitively acting component, said auxiliary windings being constituted in a delta-connected configuration, and a capacitor of said capacitors is connected in parallel with each of said auxiliary windings.

2. The device according to claim 1, wherein:
   each of said auxiliary windings having two auxiliary part-windings;
   each of said high-voltage windings is inductively coupled to one of said auxiliary part-windings; and
   said auxiliary part-windings are connected to one another in series or in parallel.

3. The device according to claim 1, wherein said auxiliary windings function as compensating windings.

4. The device according to claim 1, wherein said capacitively acting component includes a static reactive power compensator which for each said at least one high-voltage terminal, contains a series-connected configuration of two-pole submodules, each of said two-pole submodules constitutes a full-bridge circuit of further power semiconductor switches and a capacitor.

5. The device according to claim 4, wherein each of said two-pole submodules contains a first terminal, a second terminal, and a first series-connected branch and a second series-connected branch, which are respectively parallel-connected to said capacitor, each of said first and second series-connected branch has a series-connected configuration of said further power semiconductor switches, wherein a potential point between said further power semiconductor switches of said first series-connected branch is connected to said first terminal of a respective one of said two-pole submodules, and a potential point between said further power semiconductor switches of said second series-connected branch is connected to said second terminal of said respective two-pole submodule.

6. The device according to claim 4, wherein said auxiliary windings are constituted in a delta-connected configuration, each potential point between two of said auxiliary windings is connected to said series-connected configuration of said two-pole submodules.

7. A device for reactive power compensation in a high-voltage grid having at least one phase conductor, the device comprising:
   at least one high-voltage terminal configured for connecting with the at least one phase conductor;
   core sections including a first core section and a second core section being elements of a closed magnetic circuit;
   high-voltage windings including a first high-voltage winding enclosing said first core section and a second high-voltage winding enclosing said second core section and connected in parallel with said first high-voltage winding;
   at least one saturation switching branch configured for a saturation of said core sections and having actuatable power semiconductor switches;
   a controller for actuating said actuatable power semiconductor switches;
   said first high-voltage winding and said second high-voltage winding each having a high-voltage end connected to said at least one high-voltage terminal and, a low-voltage side connected to said at least one saturation switching branch;
   at least one capacitively acting component having capacitors;
   auxiliary windings inductively coupled to said high-voltage windings, said auxiliary windings being interconnected with said at least one capacitively acting component, said auxiliary windings being constituted in a delta-connected configuration; and
   a potential point between two of said auxiliary windings is connected to one pole of a capacitor of said capacitors.

8. A device for reactive power compensation in a high-voltage grid having at least one phase conductor, the device comprising:
   at least one high-voltage terminal configured for connecting with the at least one phase conductor;
   core sections including a first core section and a second core section being elements of a closed magnetic circuit;
   high-voltage windings including a first high-voltage winding enclosing said first core section and a second high-voltage winding enclosing said second core section and connected in parallel with said first high-voltage winding;

at least one saturation switching branch configured for a saturation of said core sections and having actuatable power semiconductor switches;

a controller for actuating said actuatable power semiconductor switches;

said first high-voltage winding and said second high-voltage winding each having a high-voltage end connected to said at least one high-voltage terminal and, a low-voltage side connected to said at least one saturation switching branch;

at least one capacitively acting component having capacitors;

auxiliary windings inductively coupled to said high-voltage windings, said auxiliary windings being interconnected with said at least one capacitively acting component, said auxiliary windings being constituted in a delta-connected configuration, and each potential point between two of said auxiliary windings is connected via a capacitor of said capacitors to a capacitor neutral point.

9. A device for reactive power compensation in a high-voltage grid having at least one phase conductor, the device comprising:

at least one high-voltage terminal configured for connecting with the at least one phase conductor;

core sections including a first core section and a second core section being elements of a closed magnetic circuit;

high-voltage windings including a first high-voltage winding enclosing said first core section and a second high-voltage winding enclosing said second core section and connected in parallel with said first high-voltage winding;

at least one saturation switching branch configured for a saturation of said core sections and having actuatable power semiconductor switches;

a controller for actuating said actuatable power semiconductor switches;

said first high-voltage winding and said second high-voltage winding each having a high-voltage end connected to said at least one high-voltage terminal and, a low-voltage side connected to said at least one saturation switching branch;

at least one capacitively acting component having capacitors;

auxiliary windings inductively coupled to said high-voltage windings, said auxiliary windings being interconnected with said at least one capacitively acting component, said auxiliary windings being connected to one another to constitute an auxiliary winding neutral point and, at a side thereof which is averted from said auxiliary winding neutral point, said auxiliary windings are connected to one pole of a capacitor of said capacitors.

10. A device for reactive power compensation in a high-voltage grid having at least one phase conductor, the device comprising:

at least one high-voltage terminal configured for connecting with the at least one phase conductor;

core sections including a first core section and a second core section being elements of a closed magnetic circuit;

high-voltage windings including a first high-voltage winding enclosing said first core section and a second high-voltage winding enclosing said second core section and connected in parallel with said first high-voltage winding;

at least one saturation switching branch configured for a saturation of said core sections and having actuatable power semiconductor switches;

a controller for actuating said actuatable power semiconductor switches;

said first high-voltage winding and said second high-voltage winding each having a high-voltage end connected to said at least one high-voltage terminal and, a low-voltage side connected to said at least one saturation switching branch;

at least one capacitively acting component having capacitors;

auxiliary windings inductively coupled to said high-voltage windings, said auxiliary windings being interconnected with said at least one capacitively acting component, said auxiliary windings being mutually interconnected to constitute an auxiliary winding neutral point and, at their side thereof which is averted from said auxiliary winding neutral point, are connected to one another via a capacitor of said capacitors.

* * * * *